(12) United States Patent
Nago et al.

(10) Patent No.: US 6,974,275 B2
(45) Date of Patent: Dec. 13, 2005

(54) LOCKING MEMBER FOR BICYCLE COMPONENT

(75) Inventors: Daisuke Nago, Sakai (JP); Keiji Matsueda, Shimonoseki (JP)

(73) Assignee: Shimano Inc., Osaka (JP)

( * ) Notice: Subject to any disclaimer, the term of this patent is extended or adjusted under 35 U.S.C. 154(b) by 198 days.

(21) Appl. No.: 10/153,863

(22) Filed: May 24, 2002

(65) Prior Publication Data

US 2003/0219303 A1 Nov. 27, 2003

(51) Int. Cl.$^7$ ................................................ B62L 5/00
(52) U.S. Cl. .................... 403/21; 403/337; 403/408.1; 188/24.11; 188/26
(58) Field of Search ........................... 411/87, 88, 116, 411/119–121, 122–124; 403/1, 408.1, 21, 403/337; 188/24.11, 26

(56) References Cited

U.S. PATENT DOCUMENTS

| | | | | |
|---|---|---|---|---|
| 382,789 | A | * | 5/1888 | Benton .......................... 411/87 |
| 561,604 | A | * | 6/1896 | Perry ............................ 411/88 |
| 2,128,429 | A | * | 8/1938 | Olson ........................... 411/123 |
| 2,423,918 | A | | 7/1947 | Wohlhieter |
| 2,879,092 | A | * | 3/1959 | Hargrove et al. ......... 411/88 X |
| 2,955,690 | A | | 10/1960 | Bedford |
| 3,212,387 | A | * | 10/1965 | Madansky |
| 4,267,870 | A | * | 5/1981 | Warner .................... 411/122 X |
| D276,309 | S | | 11/1984 | Frieberg |
| 4,737,057 | A | * | 4/1988 | Olsson ................... 411/123 X |
| 5,562,378 | A | | 10/1996 | Blechschmidt et al. |
| 5,681,136 | A | | 10/1997 | Blair |
| H1981 | H | * | 8/2001 | Hennick ....................... 411/87 |
| 6,347,915 | B1 | | 2/2002 | Balzano |
| 6,450,746 | B1 | * | 9/2002 | Kirimoto ................... 411/87 X |
| 2001/0030086 | A1 | | 10/2001 | Lumpkin et al. |

FOREIGN PATENT DOCUMENTS

| | | | |
|---|---|---|---|
| EP | 1 167 805 A2 | 1/2002 | |
| GB | 2087504 A | * 5/1982 | ........... F16B 39/24 |

* cited by examiner

Primary Examiner—Daniel P. Stodola
Assistant Examiner—Michael P. Ferguson
(74) Attorney, Agent, or Firm—Shinjyu Global IP Counselors, LLP

(57) ABSTRACT

A bicycle component assembly is provided that includes a mounting member and a component attachment member coupled together via at least one locking member and at least a pair of fasteners. The locking member is mounted between the component attachment member and the heads of the fasteners. The locking member includes a pair of attachment portions with holes extending between contact surfaces and frictionally treated engagement surfaces of the attachment portions. A connecting section extends between the engagement portions of the locking member. The frictionally treated engagement surfaces are textured surfaces and/or coated with a frictional material. The head portions of the fasteners abut the contact surfaces to press the locking member against the component attachment member. Preferably, the attachment portions have flange sections that are bent to prevent rotation of the fasteners. Optionally, the connecting portion of the locking member can include a frictionally treated engagement surface.

25 Claims, 13 Drawing Sheets

LOCKING MEMBER FOR BICYCLE COMPONENT

BACKGROUND OF THE INVENTION

1. Field of the Invention

This invention generally relates to a locking member for a bicycle component assembly. More specifically, the present invention relates to a locking member used to securely fasten a component such as a disc brake rotor to a mounting member such as a bicycle hub of a bicycle wheel without damaging the locking member, and that prevents removal of fasteners coupling the component and the mounting member together.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire disc braking systems with better performance and reliability.

Typically, a disc brake housing or caliper is mounted to part of the front and/or rear forks of the bicycle frame, while a disc brake rotor is mounted to the front and/or rear bicycle wheels. In particular, the disc brake rotor is fixedly coupled to one the respective bicycle wheels to rotate with the wheel. The disc brake rotor should be arranged in a rotor slot between a pair of friction pads coupled to the disc brake caliper. These typical disc brake assemblies can be difficult and/or expensive to manufacture, assemble and mount to the bicycle. Moreover, these typical disc brakes do not always maintain tight connections between the various parts due to vibrations and repeated braking. Furthermore, fasteners utilized to couple various parts of these typical disc brakes can become loose leading to decreased braking performance, rattling or other problems. Accordingly, in recent years, thin locking members have been used in combination with the fasteners. However, during tightening of the fasteners, the locking member(s) tend to rotate with the fasteners, which can cause stress or damage to the locking member(s).

In view of the above, there exists a need for a locking member for a bicycle component assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a locking member for a bicycle component assembly which securely fastens a component attachment member such as a disc brake rotor to a bicycle mounting member such as a rotor attachment member of a bicycle hub.

Another object of the present invention is to provide a locking member for a bicycle component assembly which prevents rotation of the locking member during tightening of fasteners that couple the component attachment member to a bicycle mounting member in order to prevent damage to the locking member.

Another object of the present invention is to provide a locking member for a bicycle component assembly which prevents rotation or loosening of a pair of fasteners that fasten the component attachment member to a bicycle mounting member.

Yet another object of the present invention is to provide a locking member for a bicycle component assembly which is relatively simple and inexpensive to manufacture and assemble.

The foregoing objects can basically be achieved by providing a bicycle component assembly comprising a bicycle mounting member, a component attachment member, a locking member, a first fastener and a second fastener. The bicycle mounting member has first and second attachment openings. The component attachment member has first and second through openings aligned with the first and second attachment openings and a coupling surface facing away from the bicycle mounting member. The locking member overlies the coupling surface of the component attachment member and includes a first attachment portion, a second attachment portion and a connecting portion. The first attachment portion has a first contact surface and a first frictionally treated engagement surface with a first hole extending therebetween. The first hole is aligned with the first through opening. The second attachment portion has a second contact surface and a second frictionally treated engagement surface with a second hole extending therebetween. The second hole is aligned with the second through hole. The connecting portion extends between the first and second attachment portions. The first fastener has a first head portion and a first shaft portion. The first shaft portion extends through the first hole and the first through opening into the first attachment opening to couple the component attachment member to the bicycle mounting member. The first head portion contacts the first contact surface to press the first frictionally treated engagement surface against the coupling surface of the component attachment member. The second fastener has a second head portion and a second shaft portion. The second shaft portion extends through the second hole and the second through opening into the second attachment opening to couple the component attachment member to the bicycle mounting member. The second head portion contacts the second contact surface to press the second frictionally treated engagement surface against the coupling surface of the component attachment member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
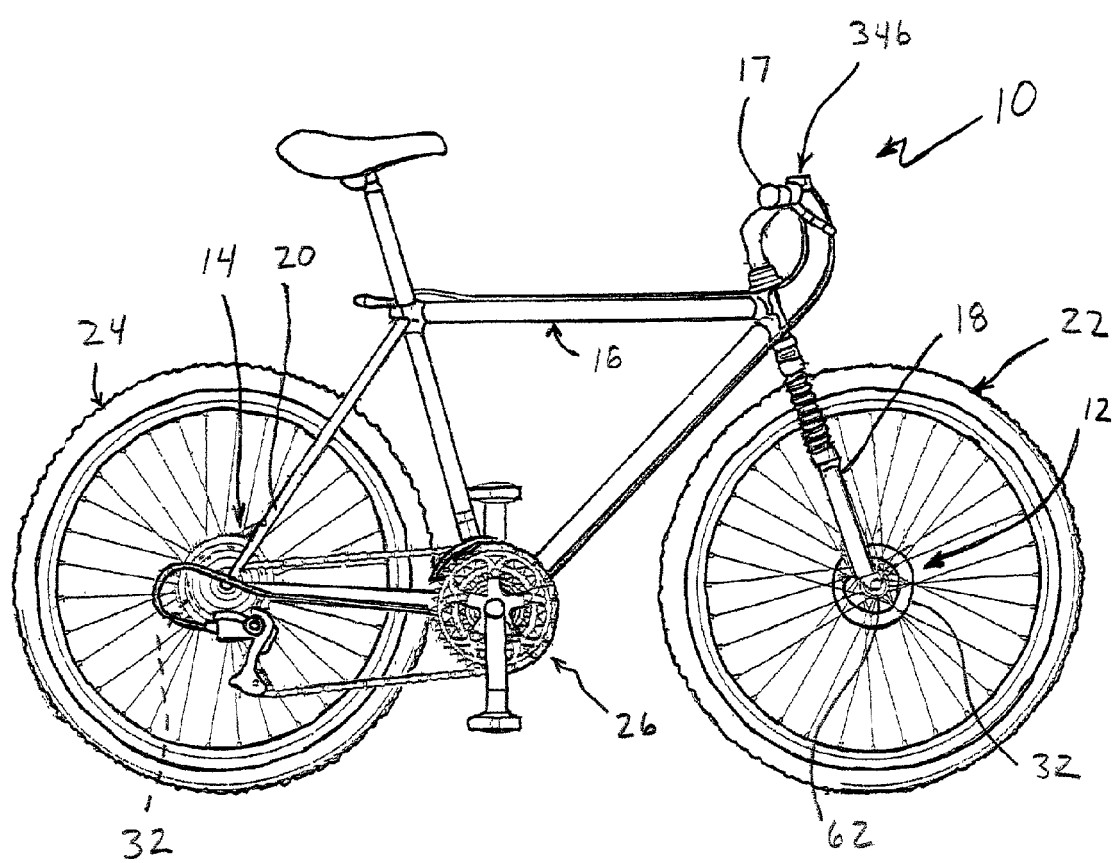
FIG. 1 is a side elevational view of a conventional bicycle with front and rear disc brake assemblies in accordance with a first embodiment of the present invention.
Figure 2:
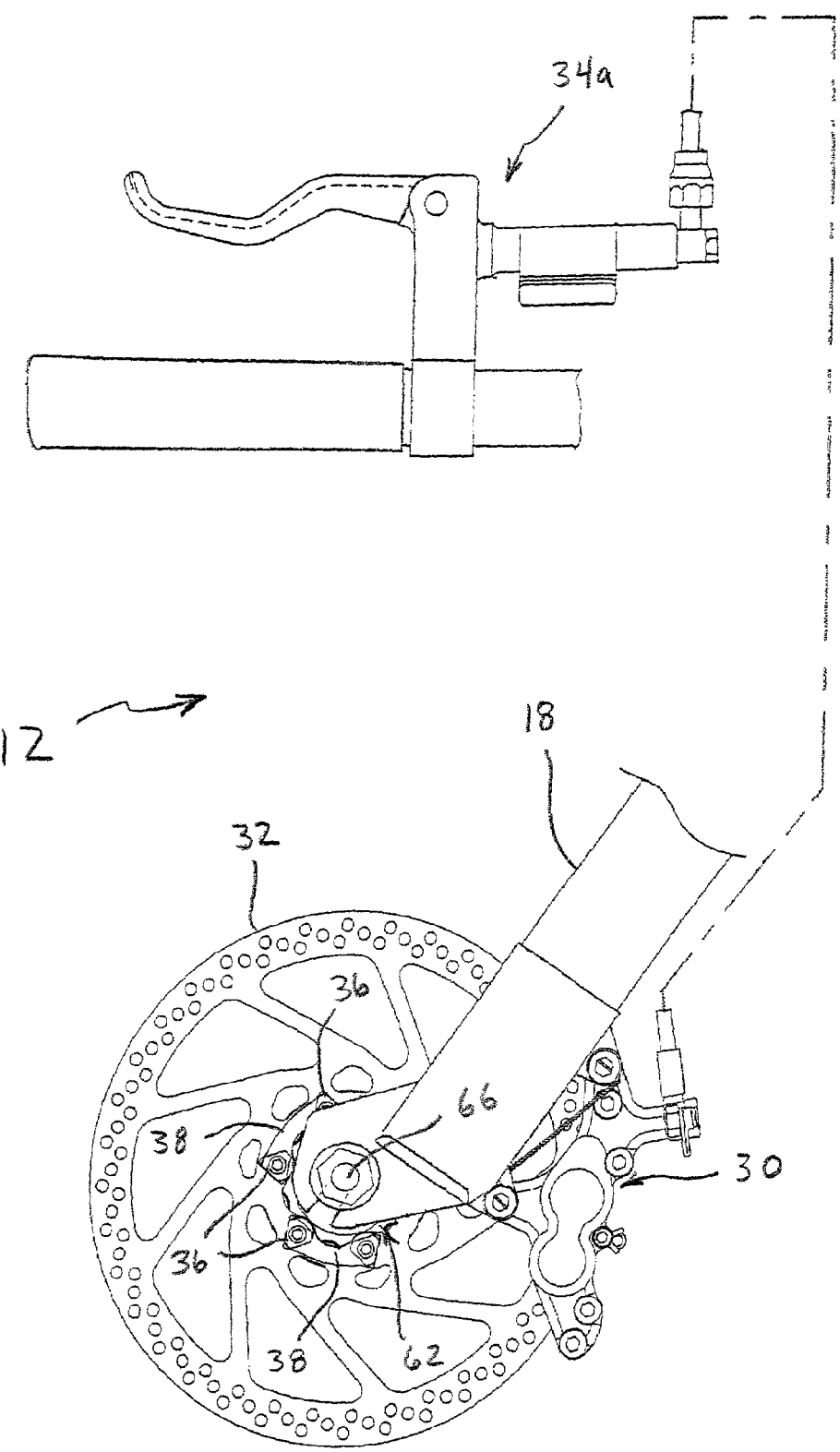
FIG. 2 is a schematic elevational view of the front disc brake assembly coupled to a front fork and a front disc brake actuator of the bicycle illustrated in FIG. 1.
Figure 3:
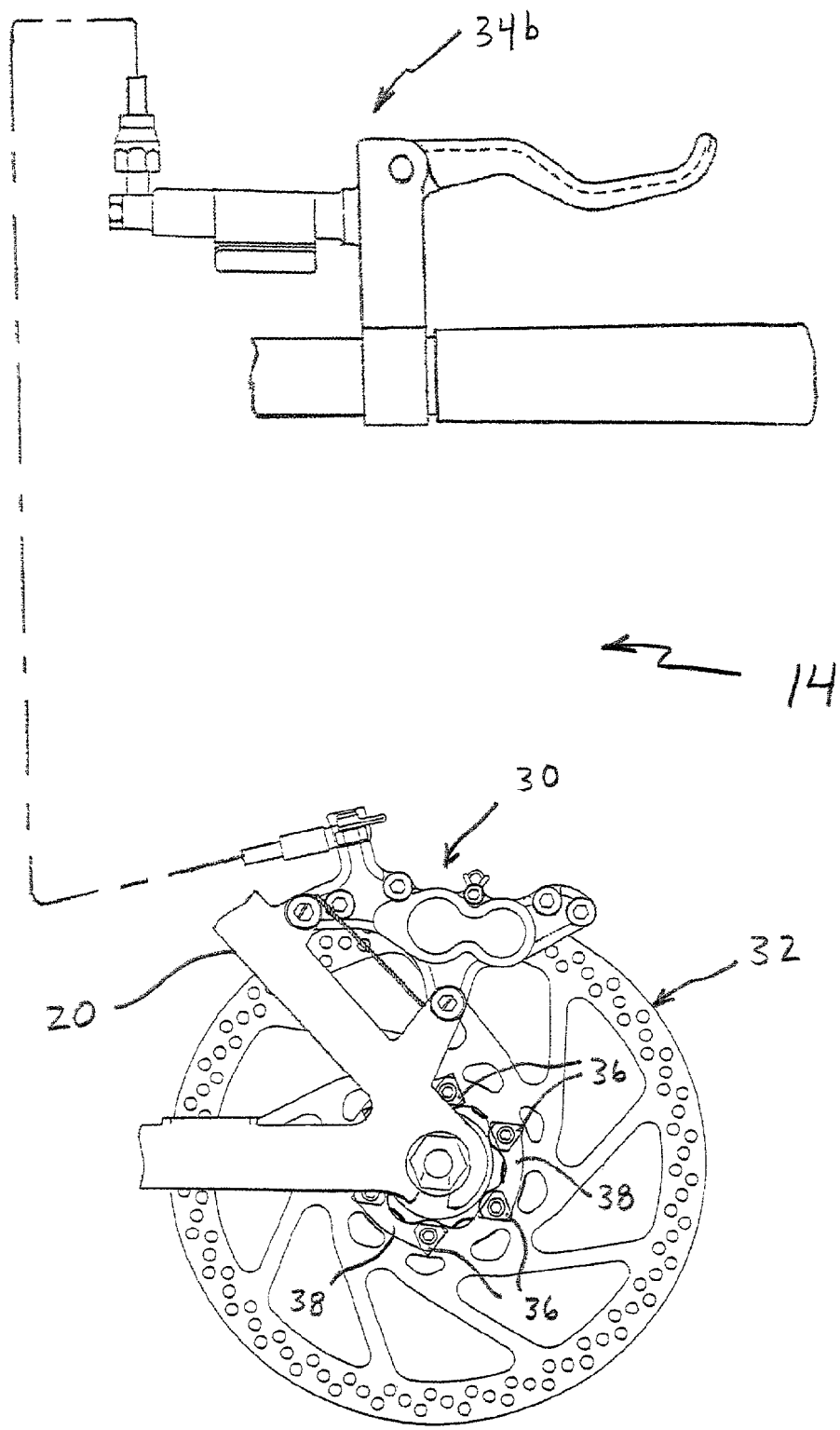
FIG. 3 is a schematic elevational view of the rear disc brake assembly coupled to a rear fork and a rear disc brake actuator of the bicycle illustrated in FIG. 1.

Referring initially to FIG. 1-3, a bicycle 10 is illustrated with front and rear disc brake assemblies 12 and 14 in accordance with a first embodiment of the present invention as discussed below. Bicycles such as the bicycle 10 and its various components are well known in the art. Thus, the bicycle 10 and its various components will not be discussed and/or illustrated in detail herein, except as related to the present invention. Moreover, it will be apparent to those skilled in the art that the bicycle 10 can be any type of bicycle, e.g., mountain bike, a hybrid bike or a road bike. The bicycle 10 is a conventional bicycle, which basically includes a bicycle frame 16 with a handle bar 17, front and rear forks 18 and 20, front and rear wheels 22 and 24 and a drive train 26. The front and rear disc brake assemblies 12 and 14 operate in a conventional manner to apply braking force to the front and rear wheels 22 and 24, respectively.

As best seen in FIGS. 2 and 3, the front disc brake assembly 12 of the present invention basically includes a disc brake caliper 30 fixedly coupled to the front fork 18, a disc brake rotor 32 fixedly coupled to the front wheel 22 and a front brake actuator 34a. The rear disc brake assembly 14 is identical to the front disc brake assembly 12, except the rear disc brake assembly includes a modified rear brake actuator 34b. The rear brake actuator 34b is identical to the front brake actuator 34a, except the rear brake actuator 34b is a mirror image of the front brake actuator 34a. Thus, the rear disc brake assembly 14 of the present invention basically includes a disc brake caliper 30 fixedly coupled to the rear fork 20, a disc brake rotor 32 fixedly coupled to the rear wheel 24 and the rear brake actuator 34b. The front and rear disc brake assemblies 12 and 14 are conventional, except for the connection of the disc brake rotors 32 to the front and rear wheels 22 and 24, respectively. Thus, the front and rear disc brake assemblies 12 and 14 will not be discussed and/or illustrated in detail herein, except for the connection of the disc brake rotors 32 to the front and rear wheels 22 and 24.

More specifically, each of the disc brake rotors 32 is fixedly coupled to one of the front and rear wheels 22 and 24 via a plurality of fasteners 36 and a plurality of locking members 38 to form a bicycle component assembly in accordance with the present invention. The front and rear wheels 22 and 24, the disc brake rotors 32 and the fasteners 36 will be discussed in more detail below. The locking members 38 are mounted between the disc brake rotors 32 and portions of the fasteners 36 to securely fasten the disc brake rotors 32 to the front and rear wheels 22 and 24. In particular, the locking members 38 are designed to frictionally engage the disc brake rotors 32 and to prevent relative rotation of the locking members 38 and relative rotation of the fasteners 36, as discussed below in more detail.

Referring to FIGS. 4-14, each locking member 38 is preferably a substantially flat thin metal plate manufactured by stamping or any other suitable manufacturing technique.

Figure 14:
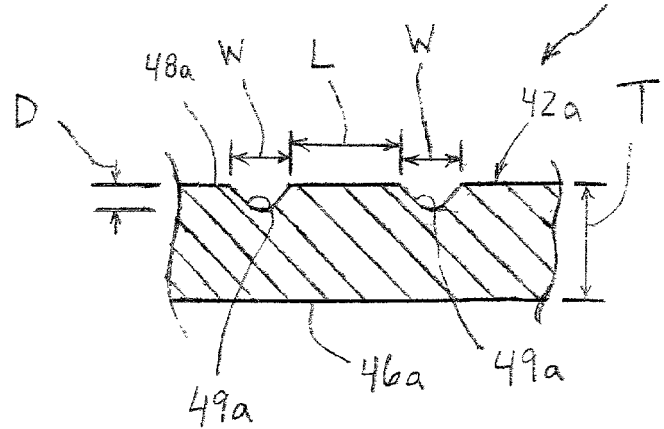
FIG. 14 is an enlarged cross-sectional view of a portion of the locking member illustrated in FIGS. 11–13, as seen along section line 14—14 of FIG. 13.

In particular, each locking member 38 is preferably constructed of iron alloy such as stainless steel type 304 (SUS 304). Each locking member 38 basically includes a first attachment portion 42a, a second attachment portion 42b and a connecting portion 44 extending between the first and second attachment portions 42a and 42b. Each locking member 38 preferably has a substantially uniform thickness T of about 0.25 millimeters. In any event, each locking member 38 preferably has a thickness T of less than about 0.5 millimeters as seen in FIG. 14. Moreover, each locking member 38 is preferably integrally formed as a one-piece unitary member by stamping or any other suitable manufacturing technique. In other words, the first attachment portion 42a, the second attachment portion 42b and the connecting portion 44 are preferably integrally formed together as a one-piece, unitary sheet metal member.

Figure 11:
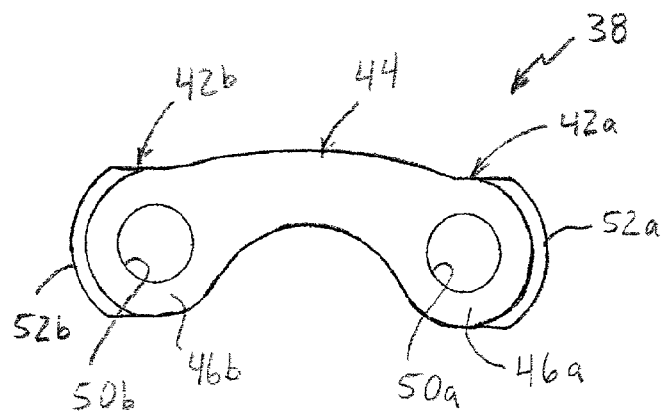
FIG. 11 is an outside elevational view of one of the locking members of the front disc brake hub (component assembly) illustrated in FIGS. 2 and 4–10.
Figure 12:
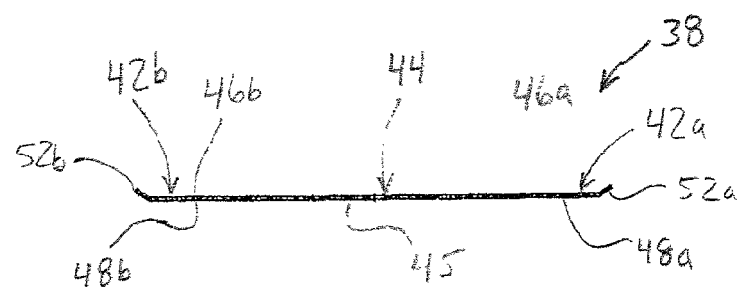
FIG. 12 is an edge elevational view of the locking member illustrated in FIG. 11.
Figure 13:
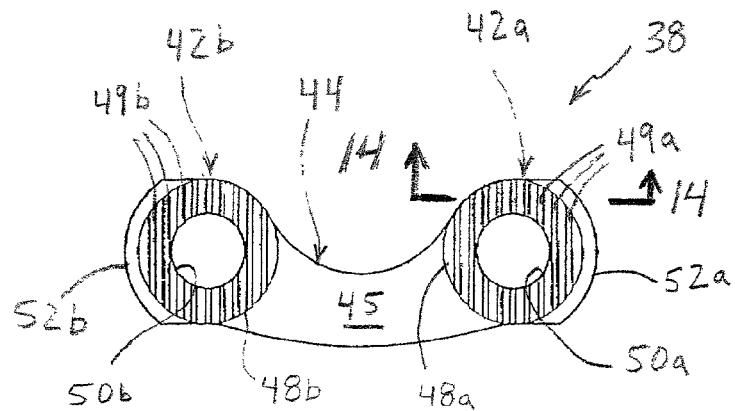
FIG. 13 is an inside elevational view of the locking member illustrated in FIGS. 11 and 12.

As best seen in FIGS. 11–13, the first attachment portion 42a is preferably an annular member that includes a first contact surface 46a, a first engagement surface 48a, a first hole 50a and a first end flange section 52a. The first contact surface 46a and the first engagement surface 48a are preferably substantially parallel surfaces. The hole 50a extends between the first contact surface 46a and the first engagement surface 48a. Thus, the first contact surface 46a and the first engagement surface 48a are substantially parallel annular surfaces with the first hole 50a extending therebetween. The first end flange section 52a is preferably an arcuate-shaped tab that extends upwardly and outwardly from the first contact surface 46a and the first engagement surface 48a. Thus, the first flange section 52a is preferably angled relative to the first contact surface 46a and the first engagement surface 48a. In particular, the first end flange 52a is preferably angled about thirty degrees relative to the first contact surface 46a and the first engagement surface 48a. The first end flange section 52a is designed to be bent (e.g., plastically deformed) to prevent rotation of one of the fasteners 36, as discussed below in more detail.

The first contact surface 46a is preferably a smooth untreated annular surface, while the first engagement surface 48a is preferably a frictionally treated surface that has a higher coefficient of friction than the first contact surface 46a. The first engagement surface 48a is arranged to contact the disc brake rotor 32 to prevent translational/rotational movement of the first attachment portion 42a. In this embodiment, the first engagement surface 48a is a preferably a textured surface that is preferably formed during the stamping of each locking member 38. The term "frictionally treated surface" as used herein should be construed to mean any surface that is modified in any way to improve/increase frictional characteristics of the surface. Of course, the present invention should not be limited to the specific embodiments of frictionally treated surfaces illustrated herein. Additionally, the term "textured surface" as used herein should be construed to mean a non-smooth surface including, but not limited to, any rough, uneven, course, bumpy, irregular or jagged surface with improved/increased frictional characteristics. Of course, the present invention should not be limited to the specific embodiments of textured surfaces illustrated herein.

In this embodiment, the first frictionally treated engagement surface 48a preferably includes a plurality of parallel first grooves 49a extending in a transverse direction. In other words, the first grooves 49a are preferably substantially perpendicular to the connecting portion 44, as discussed below in more detail. The first grooves 49a preferably have a depth D of about 0.1 millimeters and a width W of about 0.4 millimeters as shown in FIG. 14. The first grooves 49a are preferably spaced a distance L of about 1.0 millimeter from each other. Each of the first grooves 49a also preferably has a substantially curved V-shaped cross-section as shown in FIG. 14.

In any case, it will be apparent to those skilled in the art from this disclosure that the first grooves 49a can be formed using any suitable manufacturing technique as needed and/or desired. Moreover, it will be apparent to those skilled in the art from this disclosure that the first engagement surface 48a can be formed with additional grooves or can have other configurations of first grooves, as discussed below with reference to other preferred embodiments of the present invention. Furthermore, it will be apparent to those skilled in the art from this disclosure that the first engagement surface 48a can be an alternate textured surface (e.g. a textured surface formed without grooves) and/or can be coated with friction material, as discussed below with reference to other preferred embodiments of the present invention. Finally, it will be apparent to those skilled in the art the first grooves 49a can have different cross-sectional shapes as needed and/or desired.

Referring still to FIGS. 11–14, the second attachment portion 42b is a mirror image of the first attachment portion 42a. Thus, the second attachment portion 42b is preferably an annular member that includes a second contact surface 46b, a second engagement surface 48b, a second hole 50b and a second end flange section 52b. The second contact surface 46b and the second engagement surface 48b are preferably substantially parallel surfaces. The hole 50b extends between the second contact surface 46b and the second engagement surface 48b. Thus, the second contact surface 46b and the second engagement surface 48b are substantially parallel annular surfaces with the second hole 50b extending therebetween. The second end flange section 52b is preferably an arcuate-shaped tab that extends upwardly and outwardly from the second contact surface 46b and the second engagement surface 48b. Thus, the second flange section 52b is preferably angled relative to the second contact surface 46b and the second engagement surface 48b. In particular, the second flange section 52b is preferably angled about thirty degrees relative to the second contact surface 46b and the second engagement surface 48b. The second end flange section 52b is designed to be bent (e.g., plastically deformed) to prevent rotation of one of the fasteners 36, as discussed below in more detail.

The second contact surface 46b is preferably a smooth untreated annular surface, while the second engagement surface 48b is preferably a frictionally treated surface that has a higher coefficient of friction than the second contact surface 46b. The second engagement surface 48b is arranged to contact the disc brake rotor 32 to prevent translational/rotational movement of the second attachment portion 42b. In this embodiment, the second engagement surface 48b is a preferably a textured surface that is preferably formed during the stamping of each locking member 38. More specifically, the second engagement surface 48b preferably includes a plurality of parallel second grooves 49b extending in a transverse direction. In other words, the second grooves 49b are preferably substantially perpendicular to the connecting portion 44, as discussed below in more detail. Moreover, the second grooves 49b are preferably parallel to the first grooves 49a of the first attachment portion 42a. The second grooves 49b are identical to the first grooves 49a, and thus, also preferably have a depth D of about 0.1 millimeters and a width W of about 0.4 millimeters (shown only in FIG. 14 with reference to the first attachment portion 42a). The second grooves 49b are preferably spaced a distance L of about 1.0 millimeter from each other. Each of the second grooves 49b also preferably has a substantially curved V-shaped cross-section. In other words, the second attachment portion 42b is preferably identical to the first attachment portion 42a except the second attachment portion 42b is a mirror image of the first attachment portion 42a.

Thus, it will be apparent to those skilled in the art from this disclosure that the second grooves 49b can be formed using any suitable manufacturing technique as needed and/or desired. Moreover, it will be apparent to those skilled in the art from this disclosure that the second engagement surface 48b can be formed with additional grooves or can have other configurations of second grooves as discussed below with reference to other preferred embodiments of the present invention. The second engagement surface 48b also can be different from the first engagement surface 48a, if needed and/or desired. However, preferably the second engagement surface 48b is identical to the first engagement surface 48a. Furthermore, it will be apparent to those skilled in the art from this disclosure that the second engagement surface 48b can be an alternate textured surface (e.g. a textured surface formed without grooves) and/or can be coated with friction material, as discussed below with reference to other preferred embodiments of the present invention. Finally, it will be apparent to those skilled in the art the second grooves 49b can have different cross-sectional shapes as needed and/or desired.

The connecting portion 44 is a curved member that extends between the first attachment portion 42a and the second attachment portion 42b as best seen in FIGS. 11–14. In particular, the connecting portion 44 extends from one side of the first attachment portion 42a in a direction substantially opposite to the direction of the first end flange section 52a. The connecting portion 44 also extends from one side of the second attachment portion 42b in a direction substantially opposite to the direction of the second end flange section 52b. Thus, the first and second end flange sections 52a and 52b form first and second transverse free edges of each locking member 38. The connecting portion 44 also preferably has a thickness T of about 0.25 millimeters (shown only in FIG. 14 with reference to the first attachment portion 42a). In any event, the connecting portion 44 preferably has a thickness T of less than about 0.5 millimeters.

The connecting portion 44 has a third engagement surface 45 that extends between the first and second engagement surfaces 48a and 48b. The third engagement surface 45 is substantially coplanar with the first and second engagement surfaces 48a and 48b. The third engagement surface 45 is arranged to contact the disc brake rotor 32. In this embodiment the third engagement surface 45 is a smooth untreated surface. In other words, in this embodiment the third engagement surface 45 preferably has a coefficient of friction substantially equal to the coefficient of friction of the first and second contact surfaces 46a and 46b.

However, it will be apparent to those skilled in the art from this disclosure that the third engagement surface 45 can be a frictionally treated surface with a higher coefficient of friction than the first and second contact surfaces 46a and 46b. In particular, it will be apparent to those skilled in the art from this disclosure that the third engagement surface 45 can be a textured surface and/or can be coated with a friction material, as discussed below with reference to other preferred embodiments of the present invention. Moreover, it will be apparent to those skilled in the art from this disclosure that the third engagement surface 45 can have a configuration identical to the first and second engagement surfaces 48a and 48b if needed and/or desired Referring again to FIGS. 1–3, the front and rear wheels 22 and 24 will now be discussed in more detail. The front and rear wheels 22 and 24 are conventional, except for the attachment of the disc brake rotors 32 thereto. Thus, the front and rear wheels 22 and 24 will not be discussed and/or illustrated in detail herein, except as related to the attachment of the disc brake rotors 32 thereto via the fasteners 36 and the locking members 38. Additionally, the rear wheel 24 is identical to the front wheel 22, except that the rear wheel 24 includes a conventional freewheel coupled thereto in a convention manner. Thus, the rear wheel 24 will not be discussed and/or illustrated in detail herein. Rather, it will be apparent to those skilled in the art from this disclosure that most of the descriptions and illustrations of the front wheel 22 also apply to the rear wheel 24.

Figure 4:
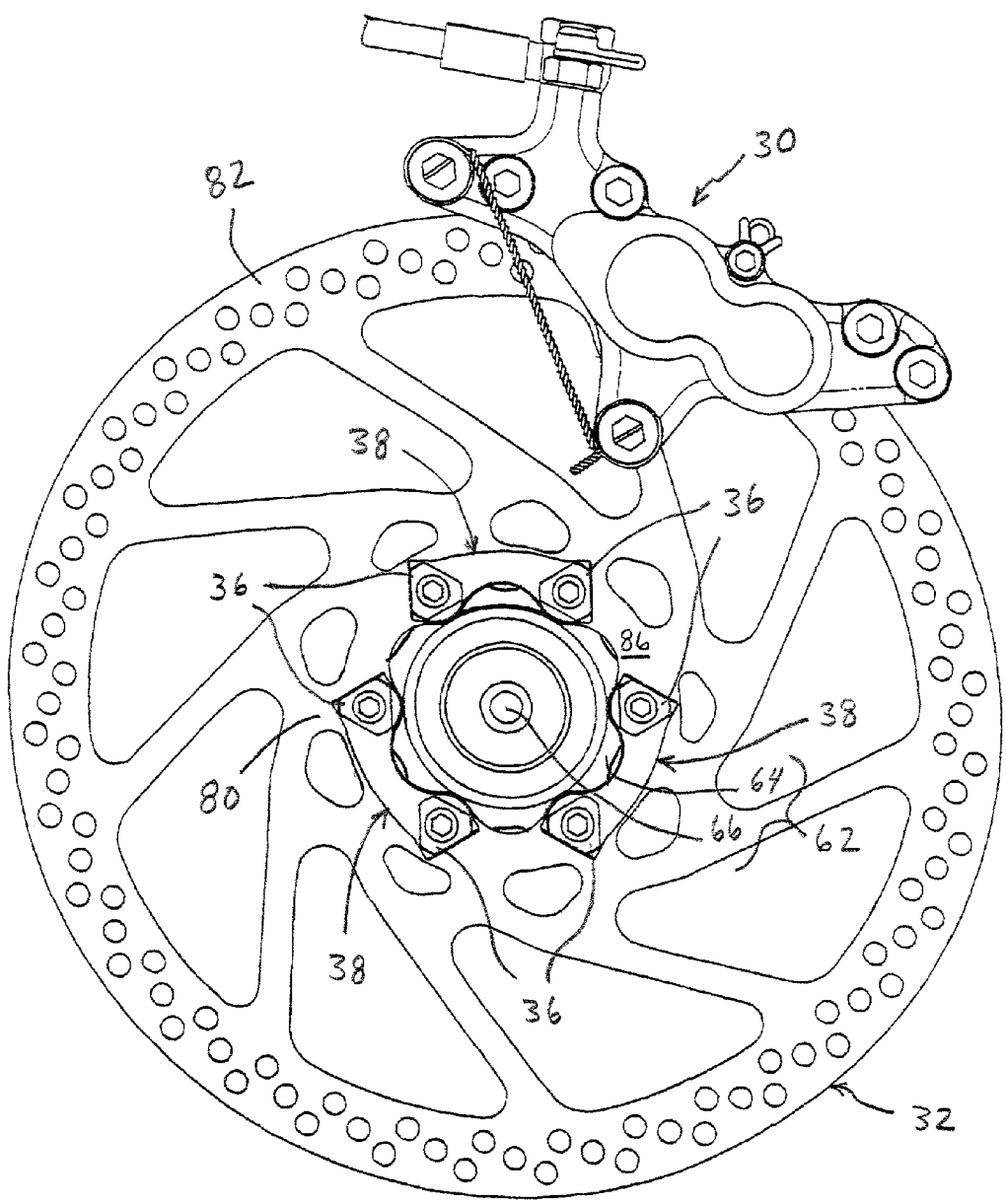
FIG. 4 is an enlarged end elevational view of an assembled front disc brake hub (component assembly) of the front disc brake assembly illustrated in FIG. 2 with the disc brake rotor coupled thereto via a plurality of fasteners and locking members.
Figure 5:
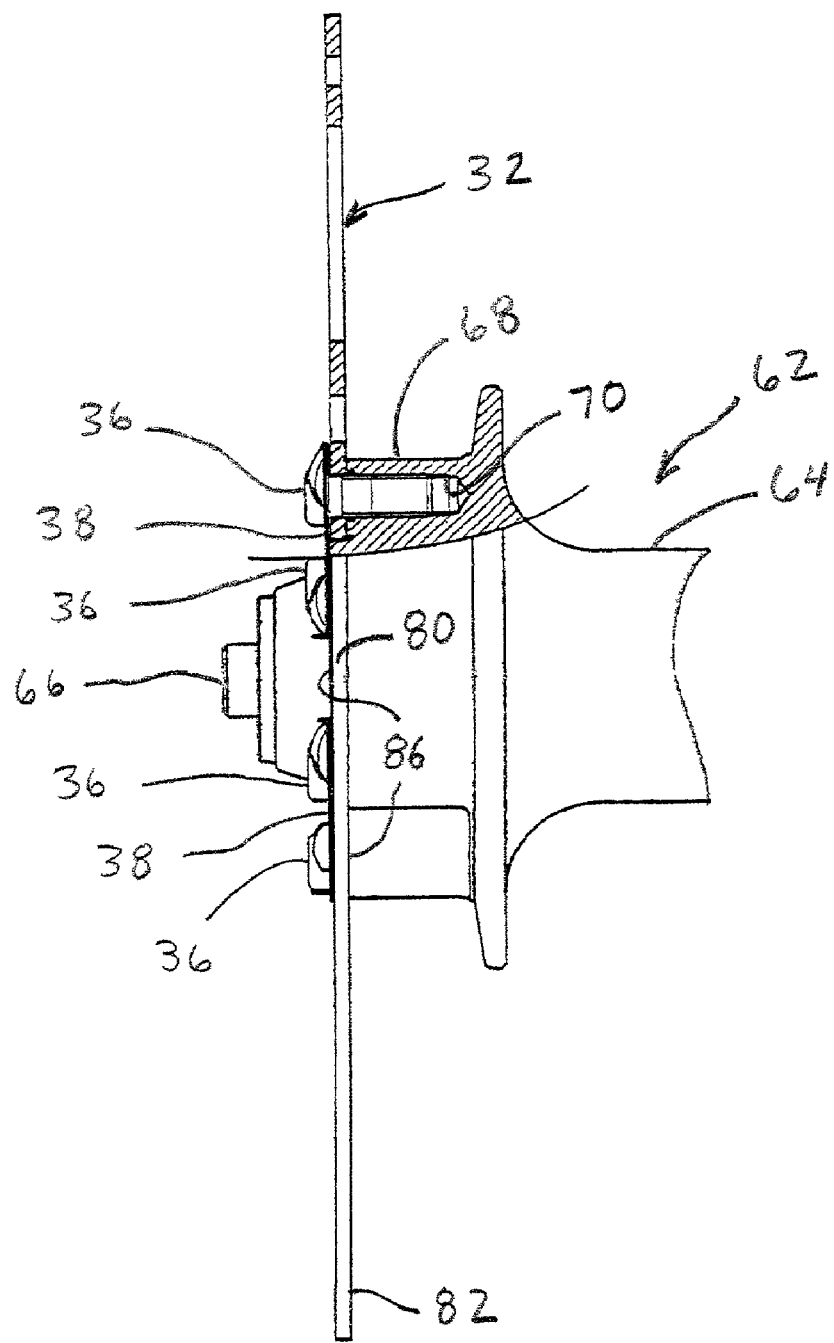
FIG. 5 is a partial longitudinal view of the assembled front disc brake hub (component assembly) illustrated in FIG. 4 with portions broken away for the purpose of illustration.
Figure 6:
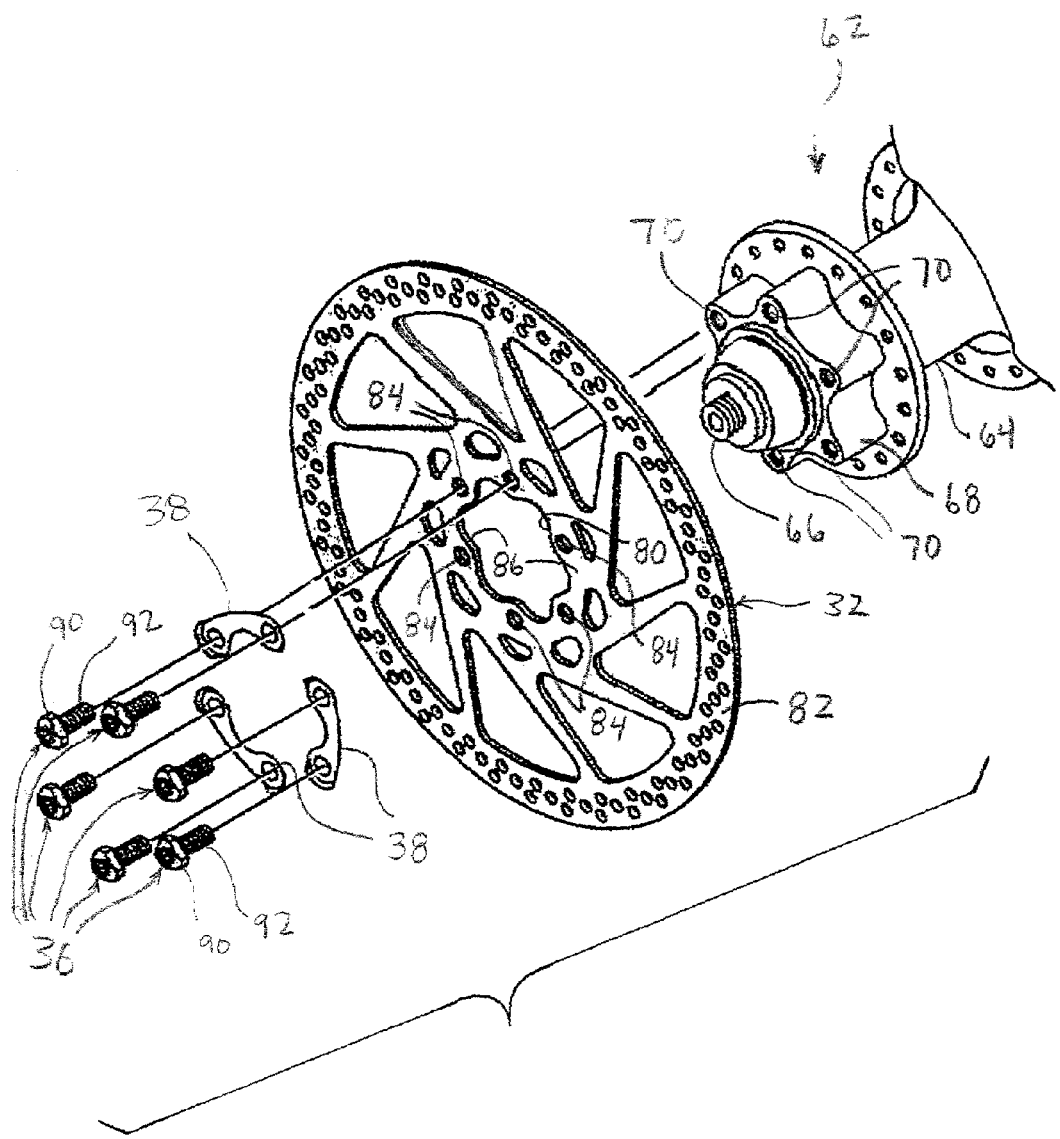
FIG. 6 is an exploded, partial perspective view of the front disc brake hub (component assembly) illustrated in FIGS. 4 and 5.
Figure 7:
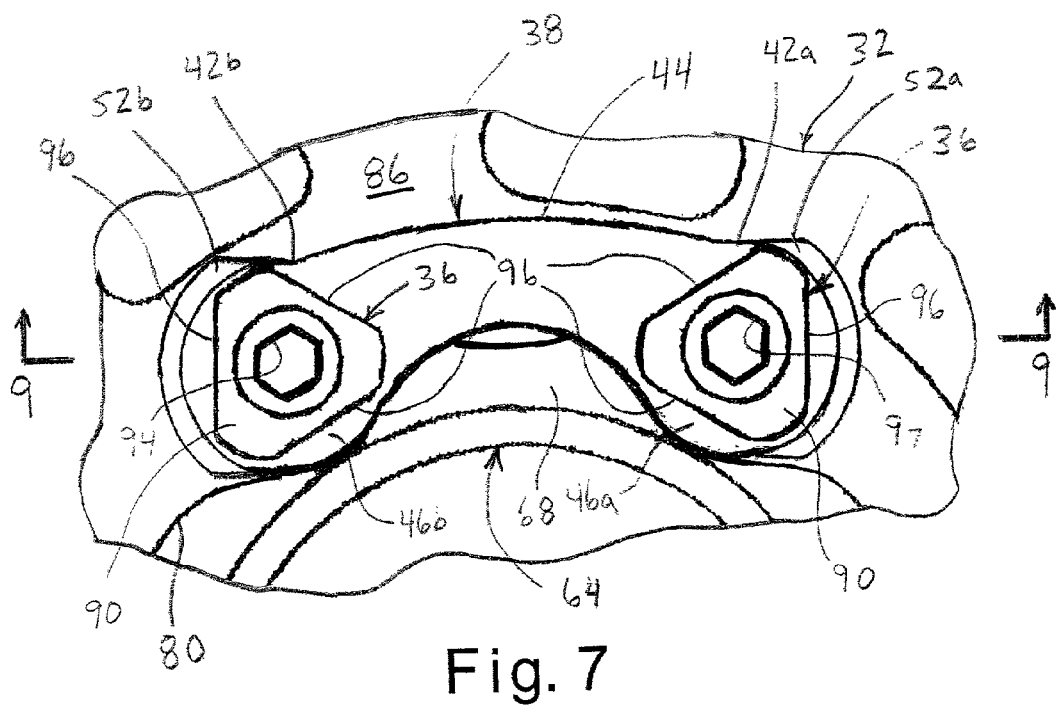
FIG. 7 is an enlarged, end elevational view of a portion of the assembled front disc brake hub (component assembly) illustrated in FIGS. 4 and 5, showing the shape of one of the locking members prior to bending.
Figure 8:
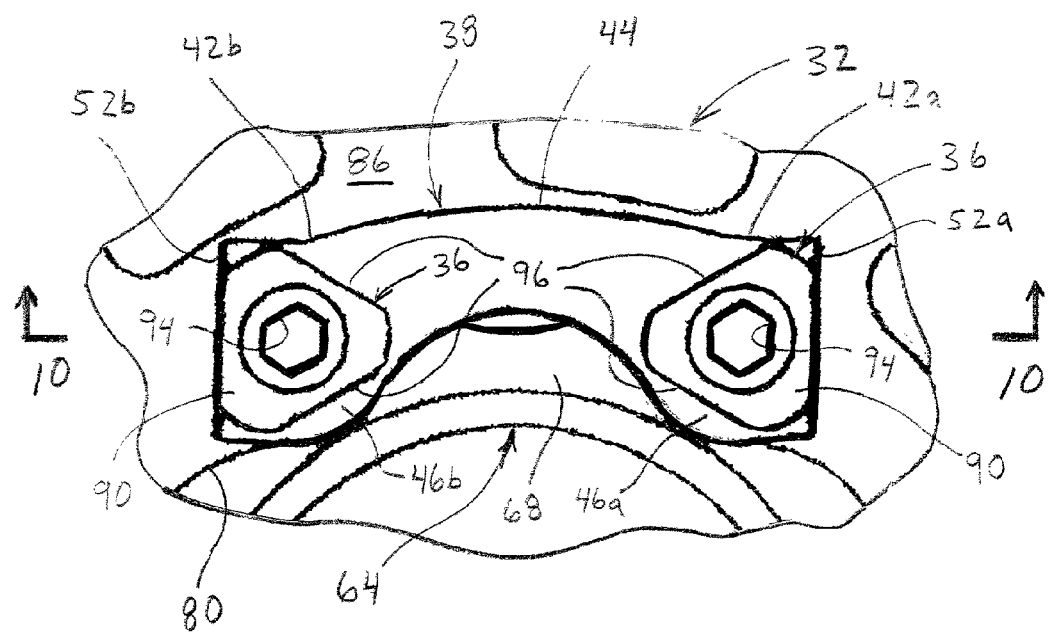
FIG. 8 is an enlarged, end elevational view of a portion of the assembled front disc brake hub (component assembly) illustrated in FIGS. 4 and 5, showing the shape of one of the locking members after bending to prevent rotation of two of the fasteners.
Figure 9:
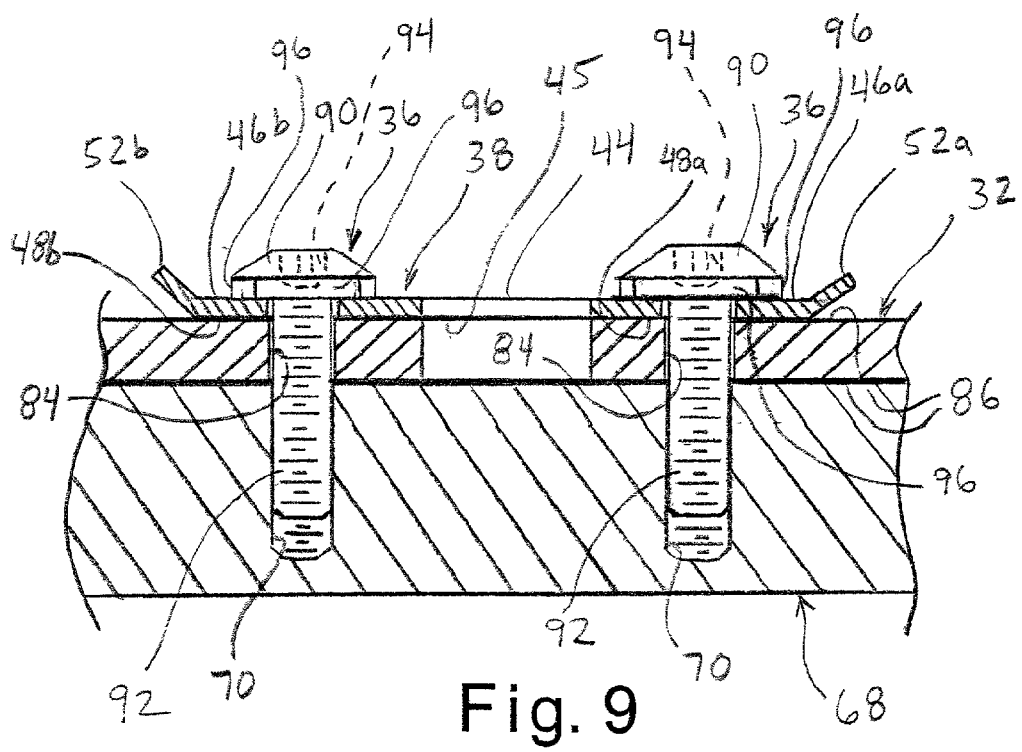
FIG. 9 is a cross-sectional view of the portion of the assembled front disc brake hub (component assembly) illustrated in FIG. 7 as viewed along section line 9—9 of FIG. 7, showing the shape of one of the locking members prior to bending.
Figure 10:
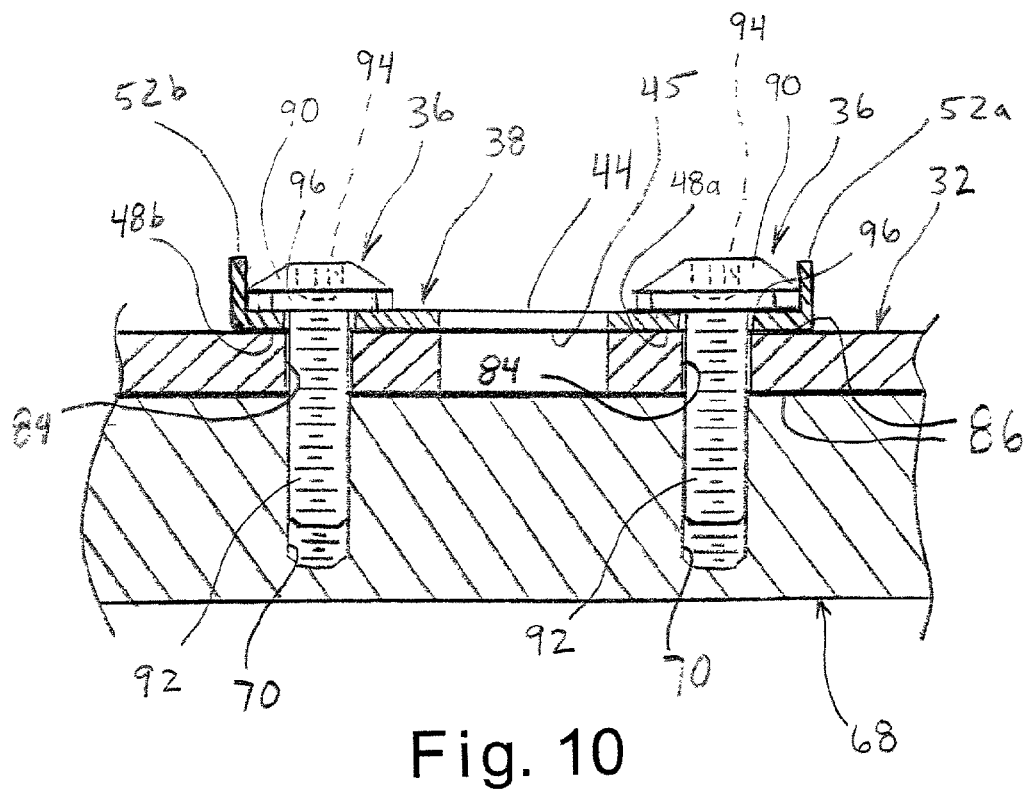
FIG. 10 is a cross-sectional view of the portion of the assembled front disc brake hub (component assembly) illustrated in FIG. 8 as viewed along section line 10—10 of FIG. 8, showing the shape of one of the locking members after bending to prevent rotation of two of the fasteners.

More specifically, the front wheel 22 basically includes a rim coupled to a front hub 62 via a plurality of spokes in a conventional manner as seen in FIG. 1. Of course, any suitable rim could be coupled to the front hub 62 utilizing any suitable technique such as those that are well known in the art, without departing from the scope of the present invention. The front hub 62 is a disc brake hub that basically includes a hub body 64 and a hub axle 66 as best seen in FIGS. 4–6. The hub axle 66 is rotatably mounted within an interior passageway of the hub body 64 in a conventional manner such that the hub body 64 freely rotates about the hub axle 66.

The hub body 64 includes a rotor attachment portion or mounting member 68 arranged at one end thereof as best seen in FIG. 6. The rotor attachment portion 68 is preferably integrally formed with the hub body 64 to form the bicycle mounting member with the hub body 64. However, it will be apparent to those skilled in the art from this disclosure that the rotor attachment portion 68 could be a separate member from the hub body 64 that is fixedly coupled to the hub body 64.

The rotor attachment portion 68 preferably includes a plurality (six) of threaded attachment openings 70 formed therein. Preferably, the threaded openings 70 are blind threaded bores configured to threadedly couple the fasteners 36 therein to fixedly couple the disc brake rotor 32 thereto. Of course, it will be apparent to those skilled in the art from this disclosure that the attachment openings 70 could be unthreaded through openings such that nuts can be used with the fasteners 36 if needed and/or desired. In any event, the threaded openings 70 can be considered first or second threaded attachment openings depending on the arrangement of the locking members 38, as discussed below in more detail. In particular, the three threaded openings 70 aligned with the first holes 50a of the locking members 38 are considered first attachment openings, while the three threaded openings 70 aligned with the second holes 50b of the locking members 38 are considered second attachment openings. In the illustrated embodiment, the rotor attachment portion 68 has a non-circular shape with a flat free end surface designed to contact the inner periphery of the rotor 32. However, it will be apparent to those skilled in the art that the rotor attachment portion 68 could have other configurations as needed and/or desired without departing from the scope of the present invention.

Referring now to FIGS. 4–10, the disc brake rotor 32 will now be discussed in more detail. The disc brake rotor 32 is conventional. Thus, the disc brake rotor 32 will not be discussed and/or illustrated in detail herein, except as related to the connection of the disc brake rotor 32 to the rotor attachment portion 68. The disc brake rotor 32 basically includes an attachment portion 80 and a braking portion 82. The attachment portion 80 forms the inner periphery of the disc brake rotor 32, while the braking portion 82 forms the outer periphery of the disc brake rotor 32. The attachment portion 80 is preferably integrally formed with the braking portion 82 as a one-piece unitary member to form a component attachment member. However, it will be apparent to those skilled in the art from this disclosure that the disc brake rotor 32 could be constructed in any suitable manner as needed and/or desired.

The attachment portion 80 includes a plurality (six) of through openings 84 formed therein and a pair of coupling surfaces 86. The through openings 84 extend between the coupling surfaces 86. The through openings 84 are arranged to be aligned with the threaded openings 70 of the rotor attachment portion 68. The through openings 84 are configured to receive the fasteners 36 therethrough, as discussed below in more detail. The through openings 84 can be considered first or second through openings. In particular, the three through openings 84 aligned with the first holes 50a of the locking members 38 are considered first through openings, while the three through openings 84 aligned with the second holes 50b of the locking members 38 are considered second through openings. When the disc brake rotor 32 is coupled to the hub body 64, one of the coupling surfaces 86 contacts the rotor attachment portion 68 while the other coupling surface 86 contacts the first and second engagement surfaces 48a and 48b of the locking members 38, as discussed below in more detail.

Referring still to FIGS. 4–10, the fasteners 36 will now be discussed in more detail. Preferably, the disc brake rotor 32 is coupled to the rotor attachment portion 68 of the hub body 64 via a plurality (6) of the fasteners 36. The fasteners 36 are preferably identical to each other. Preferably, each of the fasteners includes a head portion 90 and a threaded shaft portion 92 extending from the head portion 90. Preferably, each shaft portion 92 is threadedly coupled within one of the blind threaded openings 70 of the rotor attachment portion 68. Moreover, each shaft portion 92 preferably extends through one of the first and second holes 50a and 50b of the locking members 38, and through one of the through openings 84 of the disc brake rotor 32.

Each of the head portions 90 preferably has a non-circular outer shape in order to selectively engage one of the end flange sections 52a or 52b of one of the locking members 38. Additionally, a blind hexagonal bore 94 is preferably formed in each of the head portions 92 to facilitate use of a hexagonal wrench (not shown) to rotate the fasteners 36. The non-circular outer shape of the head portion 90 is preferably a substantially triangular shape formed by three flat surfaces 96. One or more of the flat surfaces 96 of each fastener 36 will engage one of the end flange sections 52a or 52b of one of the locking members 38 to prevent relative rotation of the fasteners 36, as discussed below.

Referring to FIGS. 2 and 4–10, attachment of the disc brake rotor 32 to the rotor attachment portion 68 via the fasteners 36 and the locking members 38 will now be discussed in more detail. Basically, the fasteners 36 and the locking members 38 are used to securely fasten the disc brake rotor 32 to the rotor attachment portion 68 of the hub body 64.

First, the disc brake rotor 32 is arranged adjacent to the rotor attachment portion 68 such that the through openings 84 are aligned with the threaded openings 70. The locking members 38 are then arranged adjacent one of the coupling surfaces 86 of the disc brake rotor 32 (e.g. the coupling surface 86 facing away from the rotor attachment portion 68). In particular, the first and second engagement surfaces 48a and 48b of each of the (three) locking members are arranged to contact the coupling surface 86 of the disc brake rotor 32 that faces away from the rotor attachment portion 68. The locking members 38 are further arranged so that the first and second holes 50a and 50b of each locking member 38 are aligned with a pair of the through openings 84 of the disc brake rotor 32.

The shaft portions 92 of the (six) fasteners 36 are then inserted through the first and second openings 50a and 50b of the locking members 38. The shaft portions 92 are further inserted through the through openings 84 of the disc brake rotor 32 and into the threaded attachment openings 70 of the rotor attachment portion 68. The head portions 90 of the fasteners 36 can be first rotated by hand such that the threaded shaft portions 92 engage the threaded attachment openings 70 of the rotor attachment portion 68. Then a conventional hexagonal wrench (not shown) is utilized to tighten the fasteners 36. Of course, the fasteners 36 could be rotated in any conventional manner if needed and/or desired.

When the fasteners are tightened, the head portions 90 press against the contact surfaces 46a and 46b of the respective locking members 38. Thus, the first and second engagement surfaces 48a and 48b of the respective locking members 38 are pressed tightly against the disc brake rotor 32. The first and second engagement surfaces 48a and 48b of the locking members frictionally engage the disc brake rotor 32 to prevent relative translational/rotational movement between the locking members 38 and the disc brake rotor 32. Because the fasteners 36 are identical to each other, tightening of the fasteners 36 naturally applies opposing forces on the locking members 38. However, due to the frictional engagement between the first and second attachment portions 42a and 42b and the disc brake rotor 32, stresses on the connecting portions 44 of the locking members 38 are reduced. Thus, damage to the clocking members 38 (connecting portions 44) is prevented. Once the fasteners 36 are completely tightened, the first and second end flange sections 52a and 52b of the respective locking members are bent using a flat-head screwdriver or a similar tool.

In particular, the first and second end flange sections 52a and 52b are bent to form a right angle (e.g., 90 degrees) with the first and second contact surfaces 46a and 46b. More specifically, the first and second end flange sections 52a and 52b are preferably bent such that they contact at least one of the flat surfaces 96 of the respective head portions 90. Of course, the first and second end flange sections 52a and 52b can be bent such that they contact a pair of the flat surfaces 96 of the respective head portions 90 depending on the orientation of the head portions 90. Thus, the end flange sections 52a and 52b engage the head portions 90 of the fasteners 36 to prevent relative rotation thereof. Thus, a tight permanent connection between the disc brake rotor 32 and the rotor attachment portion 68 is attained via the fasteners 36 and the locking members 38, without damage to the locking members 38.

In order to remove the disc brake rotor 32 from the rotor attachment portion 68 such as for service, the end flange sections 52a and 52b must first be bent out of engagement with the one or more flat surfaces 96 of the head portions 90. Then, the fasteners 36 can be rotated to release the disc brake rotor 32 from the rotor attachment portion 68.

Second Embodiment

Figure 15:
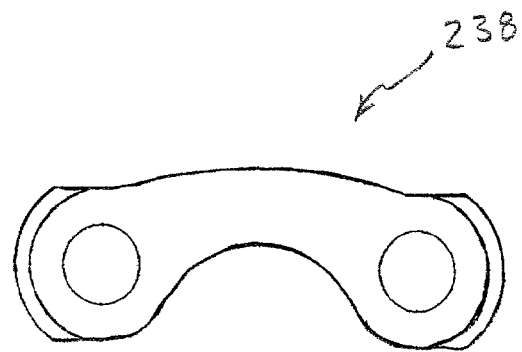
FIG. 15 is an outside elevational view of a locking member in accordance with a second embodiment of the present invention.
Figure 16:
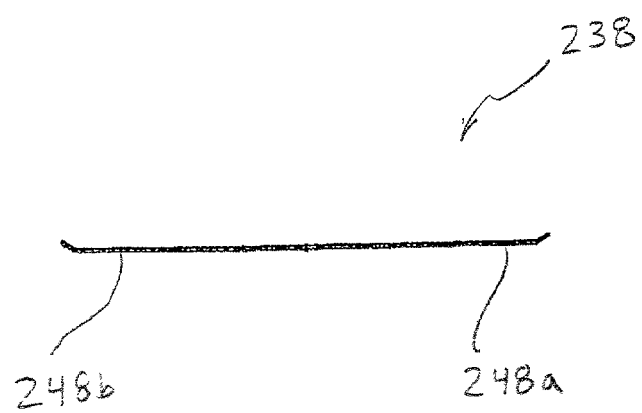
FIG. 16 is an edge elevational view of the locking member illustrated in FIG. 15.
Figure 17:
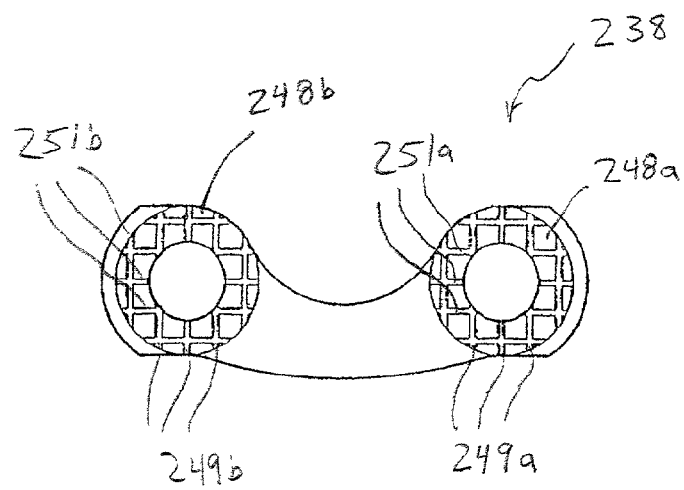
FIG. 17 is an inside elevational view of the locking member illustrated in FIGS. 15 and 16.

Referring now to FIGS. 15–17, a locking member 238 is illustrated in accordance with a second embodiment of the present invention. The locking member 238 is designed to be used with the disc brake rotor 32, the rotor attachment portion 68 and the fasteners 36 of the first embodiment. Preferably, a plurality (three) of identical locking members 238 are used with the disc brake rotor 32, the rotor attachment portion 68 and the fasteners 36 of the first embodiment. However, only one locking member 238 will be discussed and illustrated herein. The locking member 38 is used in a manner identical to the first embodiment.

Basically, the locking member 238 of this second embodiment is identical to the locking member 38 of the first embodiment, except that the locking member 238 includes modified first and second frictionally treated engagement surfaces 248a and 248b, respectively. The first and second engagement surfaces 248a and 248b are modified versions of the first and second engagement surfaces 48a and 48b of the first embodiment. Thus, the locking member 238 will not be discussed and/or illustrated in detail herein. Rather, the following description will focus mainly on the differences between the locking member 238 and the locking member 38 of the first embodiment. Moreover, it will be apparent to those skilled in the art from this disclosure that the descriptions and/or illustrations of the locking member 38 of the first embodiment also apply to the locking member 238 of this second embodiment, except as explained below.

In particular, the first engagement surface 248a preferably includes a plurality of parallel first grooves 249a, while the second engagement surface 248b preferably includes a plurality of parallel second grooves 249b. Basically, the first and second grooves 249a and 249b are identical to the grooves 49a and 49b of the first embodiment except that the grooves 249a and 249b are spaced further apart from each other, respectively. In particular, the first grooves 249a are preferably spaced about 2.0 millimeters from each other, while the second grooves 249b are also preferably spaced about 2.0 millimeters from each other. The grooves 249a and 249b preferably have cross-sectional shapes identical to the grooves 49a and 49b of the first embodiment. The first and second engagement surfaces 248a and 248b also preferably include a plurality of third and fourth grooves 251a and 251b, respectively. The third grooves 251a are preferably parallel grooves arranged at ninety degree angles relative to the plurality of first grooves 249a. Otherwise, the third grooves 251a are identical to the first grooves 249a. The fourth grooves 251b are also preferably parallel grooves arranged at ninety degree angles relative to the second grooves 249b. Otherwise, the fourth grooves 251b are identical to the second grooves 249b. Thus, the third grooves 251a are preferably spaced about 2.0 millimeters from each other, while the fourth grooves 251b are also preferably spaced about 2.0 millimeters from each other. Accordingly, the first and second engagement surfaces 248a and 248b are textured surfaces that have a substantially grid-type pattern.

Third Embodiment

Figure 18:
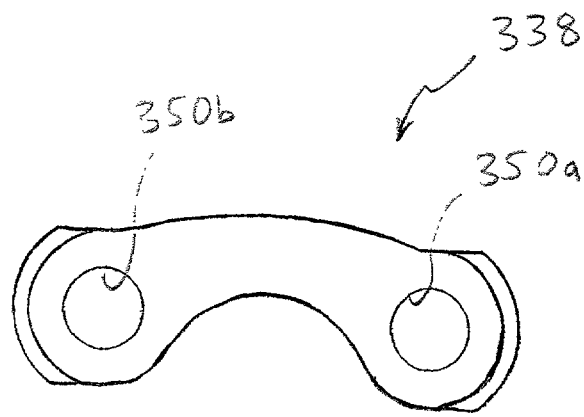
FIG. 18 is an outside elevational view of a locking member in accordance with a third embodiment of the present invention.
Figure 19:
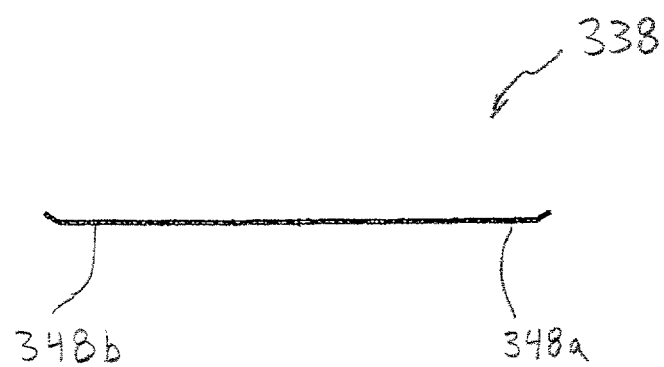
FIG. 19 is an edge elevational view of the locking member illustrated in FIG. 18.
Figure 20:
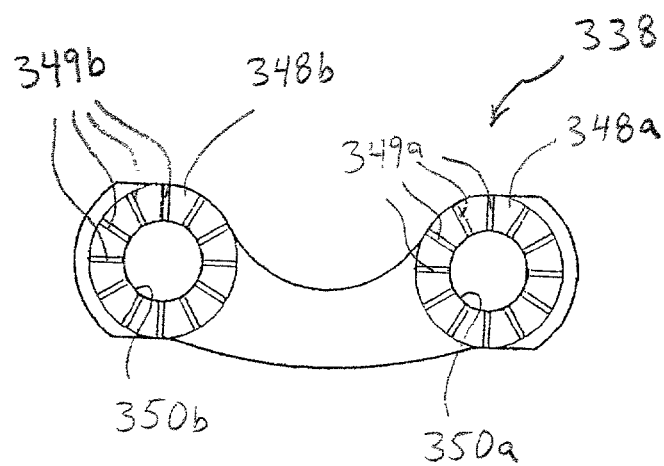
FIG. 20 is an inside elevational view of the locking member illustrated in FIGS. 18 and 19.

Referring now to FIGS. 18–20, a locking member 338 is illustrated in accordance with a third embodiment of the present invention. The locking member 338 is designed to be used with the disc brake rotor 32, the rotor attachment portion 68 and the fasteners 36 of the first embodiment. Preferably, a plurality (three) of identical locking members 338 are used with the disc brake rotor 32, the rotor attachment portion 68 and the fasteners 36 of the first embodiment. However, only one locking member 338 will be discussed and illustrated herein. The locking member 338 is used in a manner identical to the first embodiment.

Basically, the locking member 338 of this third embodiment is identical to the locking member 38 of the first embodiment, except that the locking member 338 includes modified first and second frictionally treated engagement surfaces 348a and 348b, respectively. The first and second engagement surfaces 348a and 348b are modified versions of the first and second engagement surfaces 48a and 48b of the first embodiment. Thus, the locking member 338 will not be discussed and/or illustrated in detail herein. Rather, the following description will focus mainly on the differences between the locking member 338 and the locking member 38 of the first embodiment. Moreover, it will be apparent to those skilled in the art from this disclosure that the descriptions and/or illustrations of the locking member 38 of the first embodiment also apply to the locking member 338 of this third embodiment, except as explained below.

In particular, the first engagement surface 348a preferably includes a plurality of first grooves 349a, while the second engagement surface 348b preferably includes a plurality of second grooves 349b. Basically, the first and second grooves 349a and 349b are identical to the grooves 49a and 49b of the first embodiment except that the grooves 349a and 349b are not parallel grooves. More specifically, the first and second grooves 349a and 349b extend radially outwardly from first and second holes 350a and 350b, respectively. The first grooves 349a are preferably radially spaced about thirty degrees from each other, while the second grooves 349b are also preferably radially spaced about thirty degrees from each other. The first and second grooves 349a and 349b preferably have cross-sectional shapes identical to the first and second grooves 49a and 49b of the first embodiment. Thus, the first and second engagement surfaces 348a and 348b are textured surfaces.

Fourth Embodiment

Figure 21:
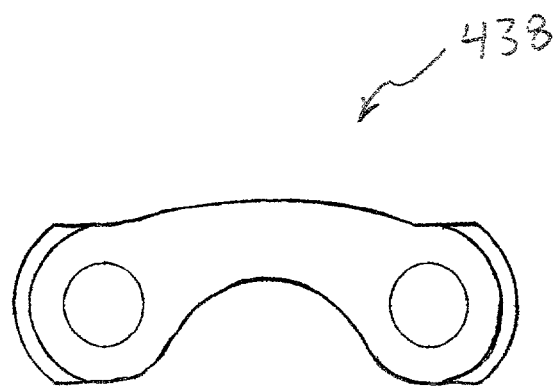
FIG. 21 is an outside elevational view of a locking member in accordance with a fourth embodiment of the present invention.
Figure 22:
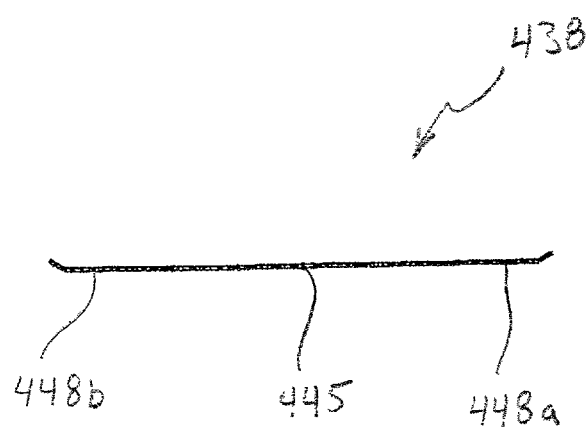
FIG. 22 is an edge elevational view of the locking member illustrated in FIG. 21.
Figure 23:
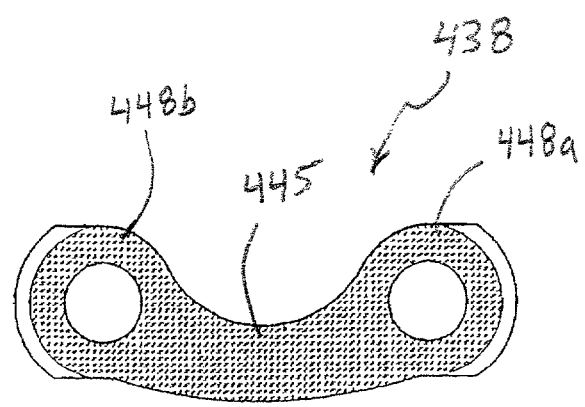
FIG. 23 is an inside elevational view of the locking member illustrated in FIGS. 21 and 22.
Figure 24:
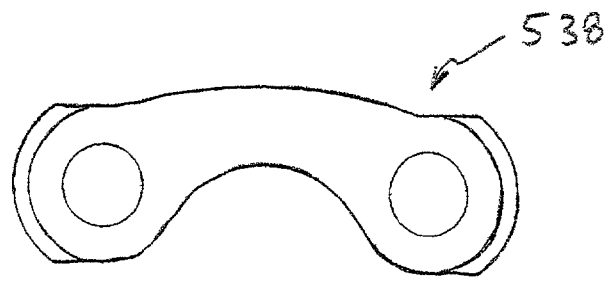
FIG. 24 is an outside elevational view of a locking member in accordance with a fifth embodiment of the present invention.
Figure 25:
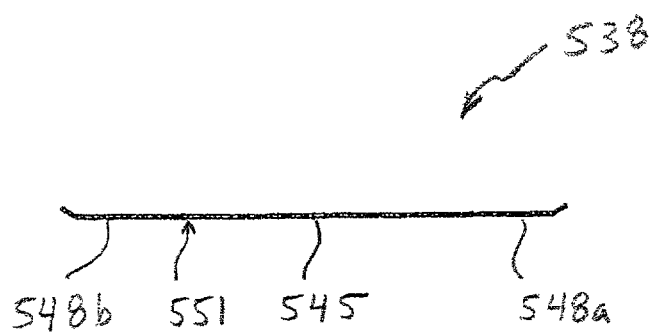
FIG. 25 is an edge elevational view of the locking member illustrated in FIG. 24.
Figure 26:
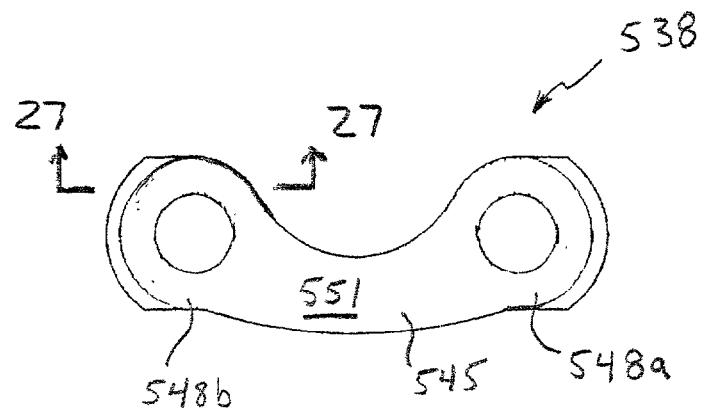
FIG. 26 is an inside elevational view of the locking member illustrated in FIGS. 24 and 25.
Figure 27:
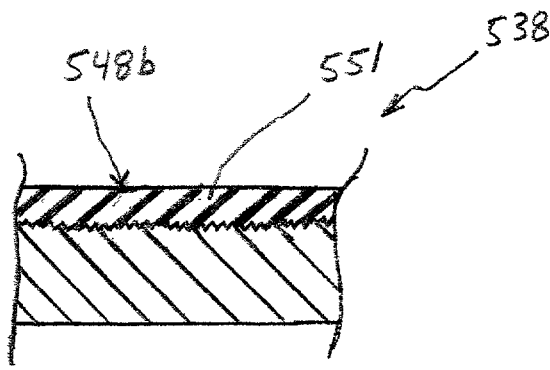
FIG. 27 is an enlarged cross-sectional view of a portion of the locking member illustrated in FIGS. 24–26, as seen along section line 27—27 of FIG. 26.

Referring now to FIGS. 21–23, a locking member 438 is illustrated in accordance with a fourth embodiment of the present invention. The locking member 438 is designed to be used with the disc brake rotor 32, the rotor attachment portion 68 and the fasteners 36 of the first embodiment. Preferably, a plurality (three) of identical locking members 438 are used with the disc brake rotor 32, the rotor attachment portion 68 and the fasteners 36 of the first embodiment. However, only one locking member 438 will be discussed and illustrated herein. The locking member 438 is used in a manner identical to the first embodiment.

Basically, the locking member 438 of this fourth embodiment is identical to the locking member 38 of the first embodiment, except that the locking member 438 includes modified first and second frictionally treated engagement surfaces 448a and 448b, respectively. The locking member 438 also preferably includes a modified frictionally treated third engagement surface 445 in this fourth embodiment. The first and second engagement surfaces 448a and 448b are modified versions of the first and second engagement surfaces 48a and 48b of the first embodiment. Thus, the locking member 438 will not be discussed and/or illustrated in detail herein. Rather, the following description will focus mainly on the differences between the locking member 438 and the locking member 38 of the first embodiment. Moreover, it will be apparent to those skilled in the art from this disclosure that the descriptions and/or illustrations of the locking member 38 of the first embodiment also apply to the locking member 438 of this fourth embodiment, except as explained below.

In particular, the first and second engagement surfaces 448a and 448b are preferably textured surfaces that do not include the grooves 49a and 49b of the first embodiment, respectively. Rather, the first and second engagement surfaces 448a and 448b are preferably textured by shot or sand blasting. Moreover, the third engagement surface 445 is also preferably a textured surface that is formed by shot or sand blasting. In particular, the first, second and third engagement surface 448a, 448b and 445 are preferably non-smooth or rough/course surfaces due to the shot blasting.

Fifth Embodiment

Referring now to FIGS. 24–27, a locking member 538 is illustrated in accordance with a fifth embodiment of the present invention. The locking member 538 is designed to be used with the disc brake rotor 32, the rotor attachment portion 68 and the fasteners 36 of the first embodiment. Preferably, a plurality (three) of identical locking members 538 are used with the disc brake rotor 32, the rotor attachment portion 68 and the fasteners 36 of the first embodiment. However, only one locking member 538 will be discussed and illustrated herein. The locking member 538 is used in a manner identical to the first embodiment.

Basically, the locking member 538 of this fifth embodiment is identical to the locking member 438 of the fourth embodiment, except that the locking member 538 includes modified first and second frictionally treated engagement surfaces 548a and 548b, respectively. The locking member 538 also preferably includes a modified frictionally treated third engagement surface 545 in this fifth embodiment. The first and second engagement surfaces 548a and 548b are modified versions of the first and second engagement surfaces 448a and 448b of the fourth embodiment. Thus, the locking member 538 will not be discussed and/or illustrated in detail herein. Rather, the following description will focus mainly on the differences between the locking member 538 and the locking member 438 of the fourth embodiment. Moreover, it will be apparent to those skilled in the art from this disclosure that the descriptions and/or illustrations of the locking member 38 of the first embodiment and the locking member 438 of the fourth embodiment also apply to the locking member 538 of this fifth embodiment, except as explained below.

In particular, the first and second engagement surfaces 548a and 548b are identical to the first and second engagement surfaces 448a and 448b of the fourth embodiment except a friction material coating or layer 551 is applied thereto. Additionally, the third engagement surface 545 is also preferably identical to the third engagement surface 445 of the fourth embodiment except it also preferably has the friction material 551 applied thereto. In other words, the first and second engagement surfaces 548a and 548b have a configuration identical to the third engagement surface 545. More specifically, the locking member 538 is formed of a base layer of a one-piece, unitary sheet metal material (e.g. identical to the locking member 438) with the friction material 551 at least partially coating one side. Preferably, the friction material 551 is a rubber material such as hydrogenated nitrile rubber (NBR) that overlies the textured surfaces of the locking member 538.

Preferably, the friction material coating 551 has a thickness of about 0.1 millimeters. Thus, if the friction material coating 551 is utilized on the locking member 438 of the fourth embodiment which is about 0.25 millimeters thick to form the locking member 538 of this fifth embodiment, the locking member 538 will have an overall thickness of about 0.35 millimeters (where the friction material is applied thereto). Alternatively, the metal layer of the locking member 538 (e.g. locking member 438 of the fourth embodiment) can be made thinner (e.g. about 0.15 millimeters thick) so that the overall thickness of the locking member 538 is about 0.25 millimeters thick. Similarly, if a friction material is applied to the locking members of the first, second and/or third embodiments, the metal layer can be 0.25 millimeters thick, or thinner (e.g. about 0.15 millimeters thick).

Of course, it will be apparent to those skilled in the art from this disclosure that other rubbers and/or frictional materials could be utilized as needed and/or desired. Additionally, it will be apparent to those skilled in the art from this disclosure that it is not necessary to coat the third engagement surface 545 with the friction material 551. Moreover, it will be apparent to those skilled in the art from this disclosure that the friction material 551 could be at least partially applied to the locking members of any of the previous embodiments if needed and/or desired. Finally, it will be apparent to those skilled in the art from this disclosure that the locking member 538 could have the friction material overlying smooth surfaces to form the first, second and third engagement surfaces 548a, 548b and 545, respectively.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle component assembly comprising:
   a bicycle mounting member having first and second attachment openings;
   a component attachment member having first and second through openings aligned with said first and second attachment openings and a coupling surface facing away from said bicycle mounting member;
   a metal locking member overlying said coupling surface of said component attachment member, said locking member including
      a first attachment portion having a first substantially smooth contact surface, a first frictionally treated engagement surface having a higher coefficient of friction than said first contact surface and a first hole extending between said first frictionally treated engagement surface and said first contact surface, said first hole being aligned with said first through opening,
      a second attachment portion having a second substantially smooth contact surface, a second frictionally treated engagement surface having a higher coefficient of friction than said second contact surface and a second hole extending between said second frictionally treated engagement surface and said second contact surface, said second hole being aligned with said second through opening, and a connecting portion extending between said first and second attachment portions;

a first fastener having a first head portion and a first shaft portion, said first shaft portion extending through said first hole and said first through opening into said first attachment opening to couple said component attachment member to said bicycle mounting member, said first head portion contacting said first contact surface to press said first frictionally treated engagement surface against said coupling surface of said component attachment member; and a second fastener having a second head portion and a second shaft portion, said second shaft portion extending through said second hole and said second through opening into said second attachment opening to couple said component attachment member to said bicycle mounting member, said second head portion contacting said second contact surface to press said second frictionally treated engagement surface against said coupling surface of said component attachment member, said first attachment portion of said locking member having a first flange section extending upwardly from said first contact surface to prevent rotation of said first head portion of said first fastener, and said second attachment portion of said locking member having a second flange section extending upwardly from said second contact surface to prevent rotation of said second head portion of said second fastener, said first flange section being bent from an initially overall arcuate shape to engage said first head portion to prevent said relative rotation of said first fastener, and said second flange section being bent from an initially overall arcuate shape to engage said second head portion to prevent said relative rotation of said second fastener.

2. The bicycle component assembly according to claim 1, wherein
said bicycle mounting member is part of a bicycle hub body, and
said component attachment member is a bicycle disk brake rotor.

3. The bicycle component assembly according to claim 1, wherein said first and second fasteners are threaded fasteners.

4. The bicycle component assembly according to claim 3, wherein
said first head portion of said first fastener has a non-circular cross-section which engages said first flange section to prevent relative rotation of said first fastener, and
said second head portion of said second fastener has a non-circular cross-section which engages said second flange section to prevent relative rotation of said second fastener.

5. The bicycle component assembly according to claim 4, wherein
each of said first and second head portions of said first and second fasteners has a substantially triangular cross-sectional shape.

6. The bicycle component assembly according to claim 1, wherein
said connecting portion includes a third frictionally treated engagement surface extending between said first and second engagement surfaces.

7. The bicycle component assembly according to claim 6, wherein
said first, second and third frictionally treated engagement surfaces are textured surfaces.

8. The bicycle component assembly according to claim 7, wherein
said first, second and third frictionally treated engagement surfaces are shot blasted surfaces.

9. The bicycle component assembly according to claim 6, wherein
said first, second and third frictionally treated engagement surfaces include at least a partial coating of a rubber material.

10. The bicycle component assembly according to claim 9, wherein
said rubber material overlies textured surfaces to form said first, second and third frictionally treated engagement surfaces.

11. The bicycle component assembly according to claim 1, wherein
said first and second frictionally treated engagement surfaces are textured surfaces.

12. The bicycle component assembly according to claim 11, wherein
said first and second frictionally treated engagement surfaces are shot blasted surfaces.

13. The bicycle component assembly according to claim 11, wherein
said first frictionally treated engagement surface includes a plurality of first grooves formed therein, and
said second frictionally treated engagement surface includes a plurality of second grooves formed therein.

14. The bicycle component assembly according to claim 13, wherein
said first and second grooves extend radially outwardly from said first and second holes, respectively.

15. The bicycle component assembly according to claim 13, wherein
said plurality of first grooves are parallel to each other, and
said plurality of second grooves are parallel to each other.

16. The bicycle component assembly according to claim 15, wherein
said first frictionally treated engagement surface includes a plurality of parallel third grooves that that cross said first grooves to form a grid pattern, and
said second frictionally treated engagement surface includes a plurality of parallel fourth grooves that cross said second grooves to form a grid pattern.

17. The bicycle component assembly according to claim 11, wherein
said first and second contact surfaces are smooth untreated surfaces.

18. The bicycle component assembly according to claim 17, wherein
said first and second contact surfaces are annular flat surfaces that surround said first and second holes, respectively.

19. The bicycle component assembly according to claim 1, wherein
said first and second frictionally treated engagement surfaces include a base metal layer with at least a partial coating of frictional material.

20. The bicycle component assembly according to claim 1, wherein said first and second attachment portions and said connecting portion of said locking member include an integrally formed base layer of a one-piece, unitary sheet metal material.

21. The bicycle component assembly according to claim 1, wherein
said initially overall arcuate shaped first flange section extends around a first center point substantially coincident with a first central axis of said first hole prior to bending said first flange section upwardly to prevent rotation of said first head portion of said first fastener, and said initially overall arcuate shaped second flange section extends around a second center point substantially coincident with a second central axis of said second hole prior to bending said second flange section upwardly to prevent rotation of said second head portion of said second fastener.

22. The bicycle component assembly according to claim 1, wherein
said initially overall arcuate shaped first flange section extends along an arc of at least ninety degrees prior to bending said first flange section upwardly to prevent rotation of said first head portion of said first fastener, and said initially overall arcuate shaped second flange section extends along an arc of at least ninety degrees prior to bending said second flange section upwardly to prevent rotation of said second head portion of said second fastener.

23. A bicycle component assembly comprising:
a bicycle mounting member having first and second attachment openings;
a component attachment member having first and second through openings aligned with said first and second attachment openings and a coupling surface facing away from said bicycle mounting member;
a metal locking member overlying said coupling surface of said component attachment member, said locking member including
a first attachment portion having a first substantially smooth contact surface, a first frictionally treated engagement surface having a higher coefficient of friction than said first contact surface and a first hole extending between said first frictionally treated engagement surface and said first contact surface, said first hole being aligned with said first through opening,
a second attachment portion having a second substantially smooth contact surface, a second frictionally treated engagement surface having a higher coefficient of friction than said second contact surface and a second hole extending between said second frictionally treated engagement surface and said second contact surface, said second hole being aligned with said second through opening, and
a connecting portion extending between said first and second attachment portions;
a first fastener having a first head portion and a first shaft portion, said first shaft portion extending through said first hole and said first through opening into said first attachment opening to couple said component attachment member to said bicycle mounting member, said first head portion contacting said first contact surface to press said first frictionally treated engagement surface against said coupling surface of said component attachment member; and
a second fastener having a second head portion and a second shaft portion, said second shaft portion extending through said second hole and said second through opening into said second attachment opening to couple said component attachment member to said bicycle mounting member, said second head portion contacting said second contact surface to press said second frictionally treated engagement surface against said coupling surface of said component attachment member,
said first attachment portion of said locking member having a first flange section that is inclined relative to said first frictionally treated engagement surface and configured to be bent to prevent rotation of said first head portion of said first fastener, and said second attachment portion of said locking member having a second flange section that is inclined relative to said second frictionally treated engagement surface and configured to be bent to prevent rotation of said second head portion of said second fastener,
said first flange section having an overall arcuate shape, and said second flange section having an overall arcuate shape.

24. The bicycle component assembly according to claim 23, wherein
said overall arcuate shaped first flange section extends around a first center point substantially coincident with a first central axis of said first hole, and said overall arcuate shaped second flange section extends around a second center point substantially coincident with a second central axis of said second hole.

25. The bicycle component assembly according to claim 23, wherein
said overall arcuate shaped first flange section extends along an arc of at least ninety degrees, and said overall arcuate shaped second flange section extends along an arc of at least ninety degrees.

* * * * *